(12) United States Patent
McClure et al.

(10) Patent No.: US 6,314,709 B1
(45) Date of Patent: Nov. 13, 2001

(54) TINE GUARD FOR WINDROW PICKUP APPARATUS

(75) Inventors: John R. McClure; T. William Waldrop, both of New Holland, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/595,480

(22) Filed: Jun. 16, 2000

Related U.S. Application Data
(60) Provisional application No. 60/152,079, filed on Sep. 2, 1999.

(51) Int. Cl.[7] .................................................. A01D 89/00
(52) U.S. Cl. ............................ 56/364; 56/132; 56/DIG. 24
(58) Field of Search ............................... 56/130, 294, 341, 56/843, 364, 371, DIG. 9, DIG. 20, DIG. 24

(56) References Cited

U.S. PATENT DOCUMENTS

| | | | |
|---|---|---|---|
| 1,877,519 | * | 9/1932 | MacGregor ............................ 56/364 |
| 3,226,921 | * | 1/1966 | Shepley ................................. 56/364 |
| 3,613,345 | * | 10/1971 | Cofer .................................... 56/364 |
| 4,223,846 | | 9/1980 | Priepke et al. ........................ 241/60 |
| 4,236,372 | * | 12/1980 | Munro et al. ......................... 56/364 |
| 4,495,756 | | 1/1985 | Greiner et al. ........................ 56/364 |
| 5,052,171 | | 10/1991 | Bich et al. ............................. 56/364 |
| 5,394,682 | * | 3/1995 | Frimml et al. ........................ 56/341 |
| 6,079,194 | * | 6/2000 | Waldrop ................................ 56/364 |

* cited by examiner

Primary Examiner—Thomas B. Will
Assistant Examiner—Nathan Mammen
(74) Attorney, Agent, or Firm—John William Stader; Larry W. Miller

(57) ABSTRACT

An improved windrow pickup attachment for a forage harvester having crop processing apparatus including an input opening for receiving crop material. The attachment includes a main frame positioned on the front of the forage harvester adjacent the input opening. A transverse reel assembly and an auger conveyor are mounted on the main frame for picking up crop material from the ground, consolidating it and conveying it to the forage harvester base unit via the input opening.

2 Claims, 6 Drawing Sheets

TINE GUARD FOR WINDROW PICKUP APPARATUS

CROSS REFERENCE TO RELATED APPLICATION

This application claims the benefit of U.S. Provisional Application No. 60/152,079, filed Sep. 2, 1999, and entitled "Method and Apparatus for Mounting Tine Guards on Windrow Pickup Attachment for Forage Harvester".

FIELD OF THE INVENTION

The present invention relates generally to crop gathering headers for agricultural harvesting machines and more particularly to a tine guard for a windrow pickup attachment for forage harvesters, and the method for mounting the tine guard on the attachment.

BACKGROUND OF THE INVENTION

The recognized agricultural practice of forage harvesting consists of cutting either green or mature crop material into discrete particles, and conveying the particles from the field to a storage facility, such as a silo. While in storage the crop material undergoes an acid fermentation to give the particles an agreeable flavor and to prevent spoilage. This overall operation, which is commonly referred to as an ensilage process, converts standing crop in the field to livestock feed, generally called silage.

An essential piece of farm machinery used for producing silage is the forage harvester which is adapted to gather standing or windrowed crop material from the field, chop it into small particles and then convey the cut crop material to a temporary storage receptacle, such as a wagon. Harvesters of this type are either self-propelled or pulled by a tractor. Typically, forage harvesters comprise a base unit having a rotary cutter having a generally cylindrical configuration with knives peripherally mounted to cooperate with a stationary shear bar for cutting material by a shearing action as it is passed across the surface of the bar. The chopped crop material is then discharged from the harvester through a spout, which directs the flow of crop material to a wagon towed behind or along side the harvester. U.S. Pat. No. 4,223,846, issued Sep. 23, 1980 in the name of E. H. Priepke et al, shows a self propelled forage harvester that has a general configuration that is typical of prior art base units.

Forage harvesters, regardless of the type, i.e., both self propelled or pull type, have a crop gathering attachment that initially encounters crop material, as the harvester moves across the field. As mentioned above, the crop being harvested is either standing, such as row crops, or lying in the field, such as grass raked into a windrow. In the case of windrowed crop, a pickup attachment, extending from the front of the harvester, typically includes a reel consisting of a plurality of fingers, each of which is moveable through a predetermined path for engaging and picking up the windrowed crop material from the ground. The fingers urge the crop material rearwardly over side-by-side stripper plates that define slots through which the fingers extend. The stripper plates terminate in the general vicinity of a transverse auger that consolidates the crop material and feeds it through a rear opening in the header to the base unit of the harvester for processing. A typical forage harvester windrow pickup attachment is shown in U.S. Pat. No. 4,495,756, issued on Jan. 29, 1985 in the name of J. G. Greiner, et al, hereby incorporated by reference.

In present day forage harvester operations there is a need for a pickup attachment that is readily serviceable. For example, U.S. Pat. No. 5,052,171, issued Oct. 1, 1991 in the name of Gary L. Bich, et al, is directed to an arrangement for mounting or removing tine guards on a pickup in a time saving manner. In the '171 patent, hereby incorporated by reference, a plurality of tine guards are affixed to upper and lower mounting plates, 30 and 32 (see FIG. 2), that are removeably secured to the pickup frame. The entire assembly is removable to gain access to elements of the reel. This obviates the time consuming task of separately removing and reattaching each individual tine guard under circumstances where field repair or routine service requires replacement of the guards or tines, or access to other reel elements enclosed within the tine guard assembly, e.g., tine bar bearings, cam follower assemblies, etc.

To this end, the present invention is directed to an improved windrow pickup attachment for forage harvesters having new and unique features for improving serviceability and attendant cost effectiveness without affecting reliability.

SUMMARY OF THE INVENTION

One object of the present invention is to provide a forage harvester windrow pickup attachment having an improved tine guard.

Another object of the present invention is to provide a forage harvester windrow pickup attachment having an improved tine guard assembly.

Still another object of the present invention is to provide an improved method for mounting a tine guard on a forage harvester windrow pickup attachment.

A further object of the present invention is to provide an improved method for mounting a plurality of tine guards on a forage harvester windrow pickup attachment.

In pursuance of these and other important objects the present invention contemplates improvements to a windrow pickup attachment for a forage harvester in which the attachment comprises a main frame mounted on the front of the forage harvester base unit in which crop processing takes place. The attachment is mounted adjacent an input opening in the harvester base unit for receiving crop material. A transverse reel, mounted on the main frame for picking up crop material from the ground, includes a series of tines and a plurality of arcuate side-by-side tine guards, each guard having first and second end portions. The tines project outwardly between the tine guards for engaging crop material and urging it upwardly and rearwardly along the tine guards. The attachment further comprises a tine guard mounting assembly comprising an upper mounting plate attached to the main frame to which the first end portions are detachably affixed, a lower mounting plate attached to the main frame to which the second end portions are detachably affixed, and means for receiving crop material from the tine guards and feeding such crop material to crop processing means via the input opening. More particularly, the invention contemplates tine guards symmetrically shaped to permit the first end portions to be interchangeably affixed to the top or bottom mounting plate and the second end portions to be interchangeably affixed to the bottom or top mounting plate, respectively.

The present invention also contemplates a method for mounting tine guards on a windrow pickup attachment of the type generally set forth in the preceding paragraph, wherein the method comprises the steps of securing to the frame the top of one of the symmetrically shaped tine guards, securing to the frame the bottom of such symmetrically shaped tine guard, detaching such symmetrically shaped tine guards at the top and bottom, and resecuring the top and bottom of such detached symmetrically shaped tine guard to the frame, whereby the top is disposed in the position the bottom was originally secured and the bottom is disposed in the position the top was originally secured.

The foregoing and other objects, features and advantages of the invention will appear more fully hereinafter from a consideration of the detailed description, which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
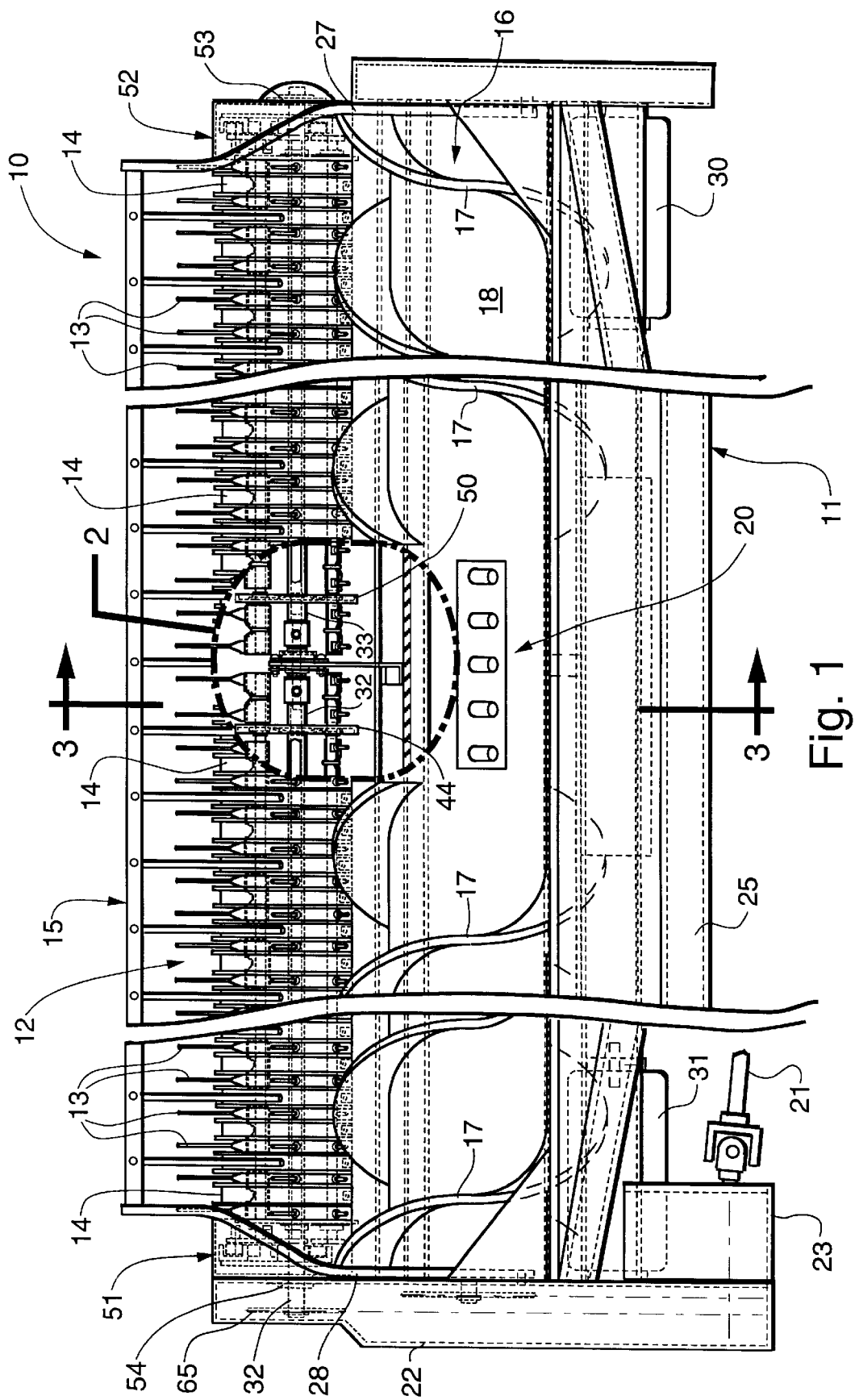
FIG. 1 is a plan view of a windrow pickup attachment, adapted for being mounted on a forage harvester, in which the present invention is readily embodied. The general location of various elements of this attachment is identified by circle "2".

Referring now to the drawings for a more detailed description of one embodiment of the present invention, FIG. 1 shows a windrow pickup attachment, generally referred to by reference numeral 10, that is readily adaptable for mounting on the front end of a forage harvester, as illustrated in U.S. Pat. No. 4,495,756, referred to above. Additionally, it should be noted that to the extent that the structure of the present invention is directed to commonly known elements of a windrow pickup attachment for forage harvesting machines, the structure of the '756 patent is incorporated by reference.

Attachment 10 comprises a frame 11, a pick-up reel 12, mounted on the frame, with conventional rotatable tines 13 operatively extending between stripper plates 14 for lifting windrowed crop material from the ground and urging it rearwardly over stripper plates 14 in a manner well known in the art. A wind guard 15 for restricting upward movement of the crop is pivotally mounted forward of an auger 16 also mounted on frame 11. Stripper plates 14, also commonly referred to as tine guards due to another of their various functions, strip and support crop material as described above, as well as guarding and guiding tines 13 as they travel through their operative paths.

Auger 16 comprises flighting 17 extending from tube 18, and a centrally located set of retractable fingers 20. Auger 16 is operable to convey crop through a central opening in the rear wall of attachment 10 towards feed rolls (not shown) mounted in the vicinity of an input opening disposed on the face of the base unit (not shown) of the forage harvester on which the attachment is mounted. In a conventional manner, the feed rolls of the base unit receive the crop material conveyed through the opening and feed it to a rotating cutter assembly (also not shown) in the base unit for processing. Drive to reel 12 and auger 16 is accomplished via PTO 21 and conventional drive elements enclosed in housings 22, 23, some of which elements are shown in phantom outline.

It should be noted that flighting 17 of auger 16 comprises oppositely wound sections on the opposing ends of tube 18 for laterally urging and consolidating the gathered crop material at a central region of auger 16 under conditions where auger 16 is being rotated by drive elements also enclosed in housings 22, 23. Retractable fingers 20 disposed at the central region of auger 16 are operable to project into the gathered crop and propel it rearwardly towards the opening in the rear wall whereupon feed rolls in the harvester base unit engage the crop and continue to convey it rearwardly as mentioned above.

Figure 2:
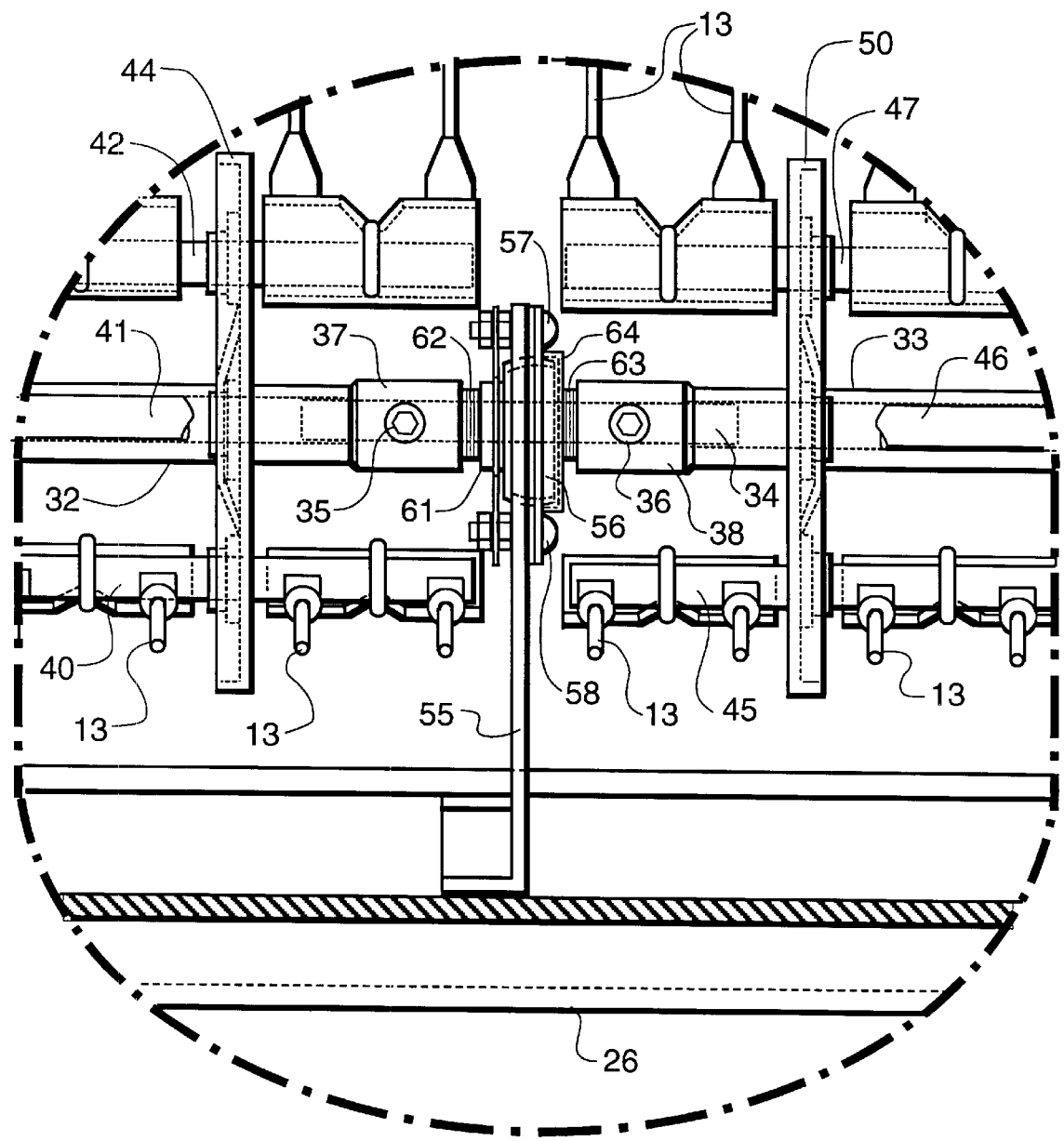
FIG. 2 is a plan view showing an enlargement of the area identified by circle "2" in FIG. 1.
Figure 3:
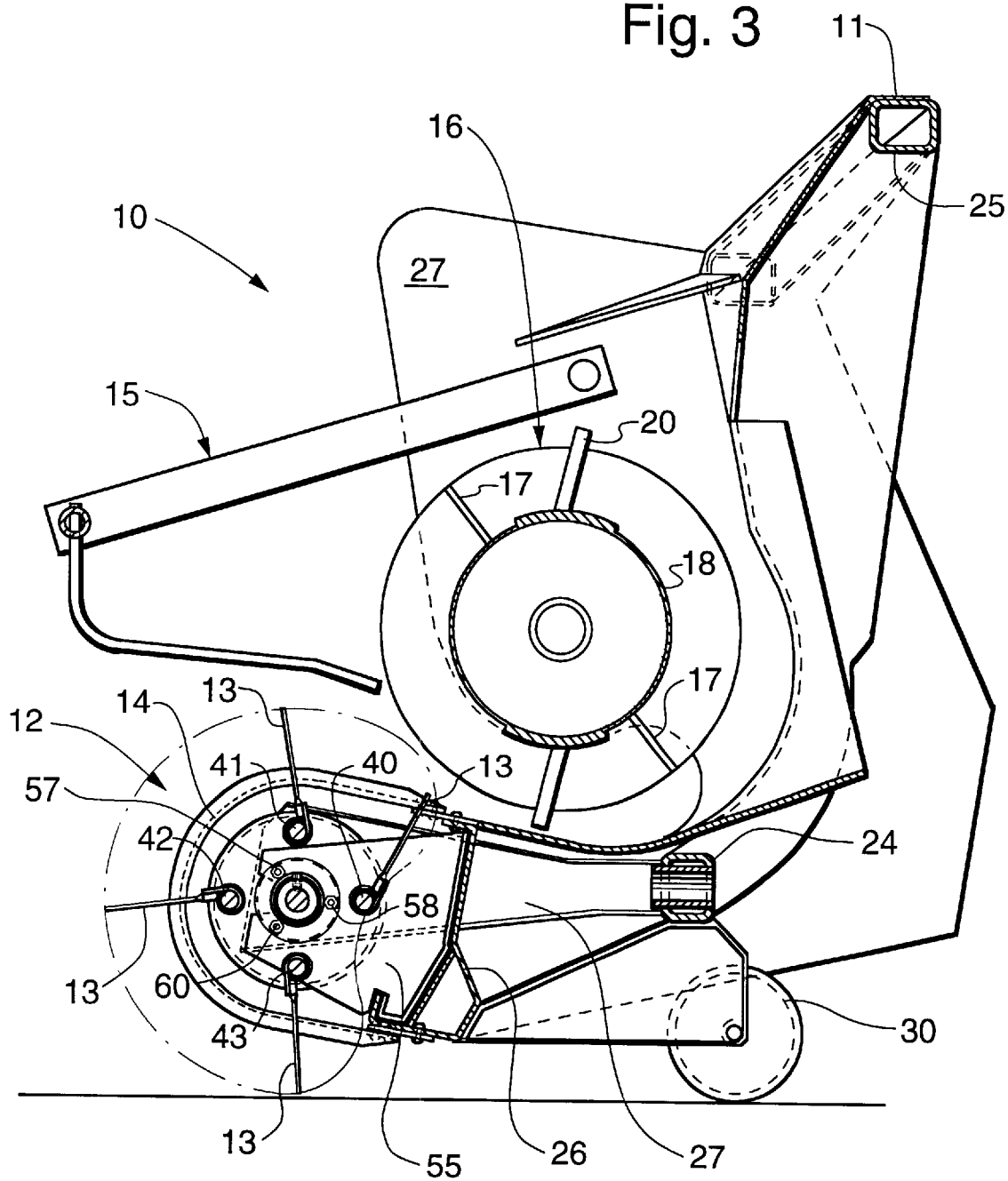
FIG. 3 is a cross sectional view taken in the direction of arrows 3—3 in FIGS. 2 and 3.

Further, FIGS. 1 and 3 show main frame assembly 11, as comprising, inter alia, a transverse rear cross beam 24, a transverse upper cross beam 25, and a transverse lower cross beam 26 (also shown in FIG. 2), all of which are rigidly secured in place by opposing end wall structure 27 and 28. All the elements of the attachment, including reel 12, tine guards 14, auger 16 and wind guard 15, are mounted on main frame assembly 11, which overall structure is supported on the ground by rollers 30, 31, during operation.

As shown in FIG. 2, pickup reel 12 comprises a shaft assembly having a left half shaft tube 32, a right half shaft tube 33 and an intermediate rigid shaft 34 in the form of a rod having an outer diameter such that it mates with the inner diameters of shaft tubes 32, and 33. Rigid shaft 34 is secured in place by set screws 35 and 36 extending radially through integral shoulder portions 37, 38 of shaft tubes 32, 33. A set of left tine bars 40, 41, 42, 43 (see FIG. 3) are mounted in reel spider 44, which is affixed to shaft tube 32 and rotatable therewith. Similarly, a set of four right tine bars 45, 46, 47 (only three are visible) are mounted in right reel spider 50, which is affixed to shaft tube 33 and rotatable therewith. The outboard ends of the tine bars are mounted in a conventional manner, i.e., left tine bars 40, 41, 42, 43 are mounted in left cam track and follower assembly 51, while right tine bars 45, 46, 47 are mounted in right cam track and follower assembly 52.

Right half shaft tube 33 is journalled in reel bearing 53 mounted on right reel end support 27, and left half shaft tube 32 is journalled in left side bearing 54. Rigid shaft 34 is journalled in center bearing assembly 56 secured to center bearing support bracket 55 by bolts 57, 58, 60. Bracket 55 is affixed to lower cross beam 26 of main frame 11, in a cantilevered fashion. Bearing assembly 56 is axially maintained by locking collar 61 which is positioned by spacing washer sets 62, 63. A bearing shield 64 is secured in place by nuts on bolts 57, 58, 60.

Thus, in operation left half shaft tube 32 and right half shaft tube 33 rotate in concert when drive gear 65 (see FIG. 1) is rotated by the power train housed in housings 22, 23. The left set of tine bars 40, 41, 42, 43, held in place by spider 44 are cammed by the cam track and follower assembly 51 to move the tine tips along a predetermined path to urge crop material along stripper plates 14. Right half shaft tube 33 moves the right tine bars 45, 46, 47 in the same manner to operate the tines thereon. A space is provided between the inner ends of corresponding right and left tine bars, e.g., see bars 42 and 47 in FIG. 2, to assure proper clearance for central bearing support bracket 55 and the various bearing assembly components, under conditions where the tine bars are being driven by the shaft assembly described above.

The above described center support for the reel obviates problems caused by the tendency of most long shafts to flex, which could result in causing the reel structure to go askew leading to bearing wear and provoking contact between the tines and the edges of the guides. In effect, supporting the shaft in the center reduces the shaft length by half insofar as flexure is concerned. Although this is an important feature, it will become apparent from the following description that the structure of the present invention is applicable to windrow pickup attachments regardless of the presence of this shaft arrangement.

Figure 4:
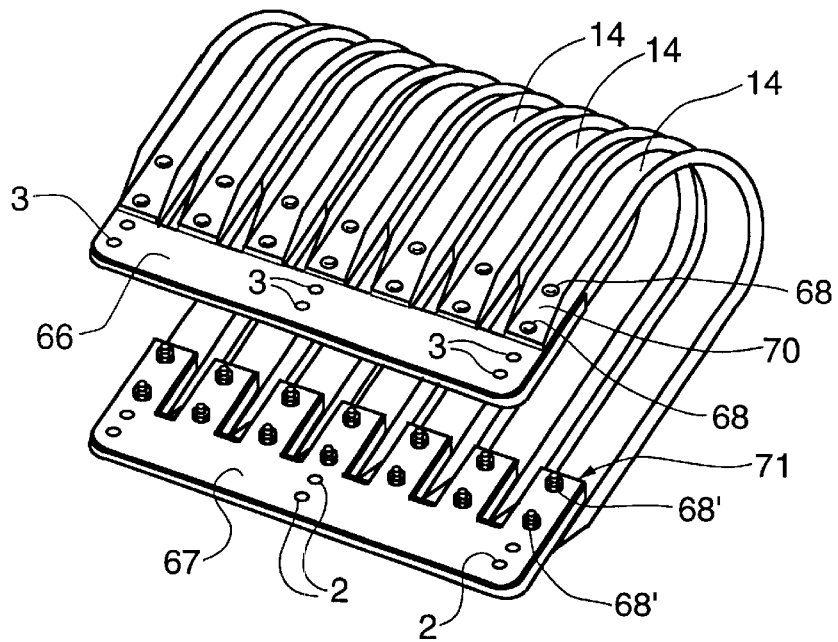
FIG. 4 is a perspective view of a section of the tine guard assembly of the present invention, in which the upper and lower mounting plates are shown.

Now turning to the crux of the present invention, FIG. 4 shows a tine guard segment comprising a grouping of seven tine guards 14 affixed to upper mounting plate 66 and lower mounting plate 67, which plates are provided with sets of mounting holes 3 and 2, respectively, for securing the segment to the main frame of the attachment. The first end portions 70 of each tine guard 14 are secured to plate 66 via nut and bolt sets 68 and the second end portions 71 of tine guards 14 are secured by similar sets 68'. Tine guards 14 are symmetrical, which permits each tine to be selectively reversed on plates 66 and 67, i.e., the first end portion 70 and the second end portion 71 of each tine guard can be secured via nut and bolt sets 68, 68' to plates 67 and 66, respectively. The need for this occurs when excessive wear takes place in a particular location on the reel assembly. This change may be accomplished after a segment has been removed or while the segment is attached to the main frame, the latter being more burdensome in some instances, depending on the geometry of the surrounding structure.

Figure 5:
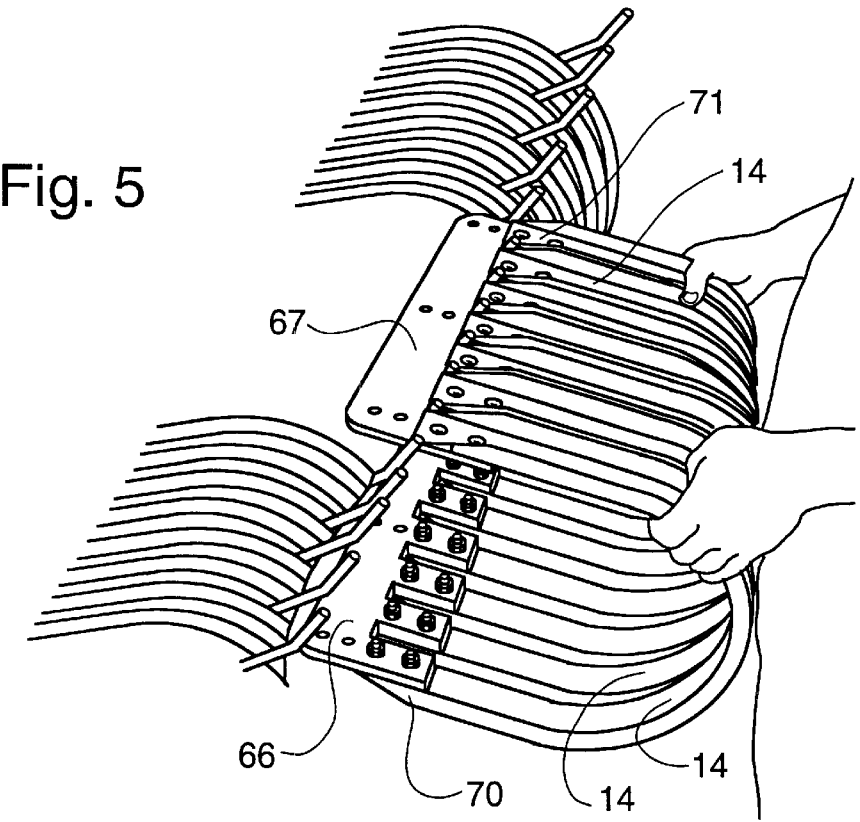
FIG. 5 is also a perspective view of a section of the tine guard assembly of the present invention.

Further, the entire segment can be reversed as shown in FIG. 5, where the segment of tine guards illustrated is being manually manipulated for securement to the main frame via lower mounting plate 67, which is in the upper position. This demonstrates the versatility of the present invention, whereby tines 14 can either be separately reversed, as described above, or reversed in groups, depending on the wear characteristics of the particular attachment. It should be noted that FIGS. 4 and 5 clearly show the comb shape configuration of mounting plates 66 and 67 on which the end portions 70 and 71 of tines 14 are affixed.

Figure 6:
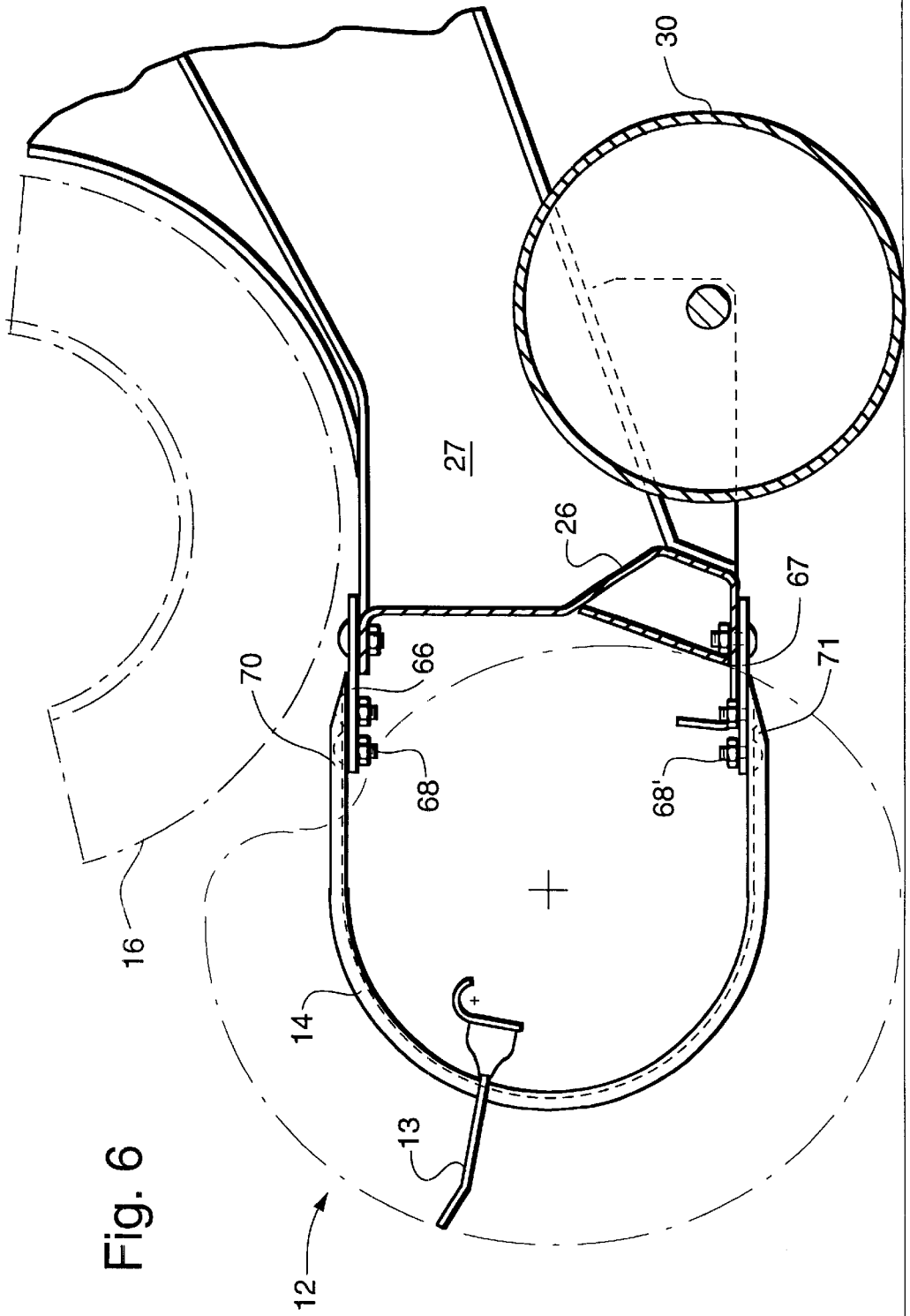
FIG. 6 is a side elevational view showing the symmetrical profile of a tine guard of the present invention.

In the preferred embodiment of the invention shown in FIG. 6, illustrative U-shaped tines guard 14 is shown with end portions 70 and 71 secured to plates 66, 67 by means of nut and bolt sets 68, 68', which plates are in turn removeably attached to appropriate upper and lower flange portions of frame 26. The shape of frame member 26 is designed for rigid support in a manner that permits roller 30 to be positioned in a desired forwardly disposed location to enhance tracking.

Figure 7:
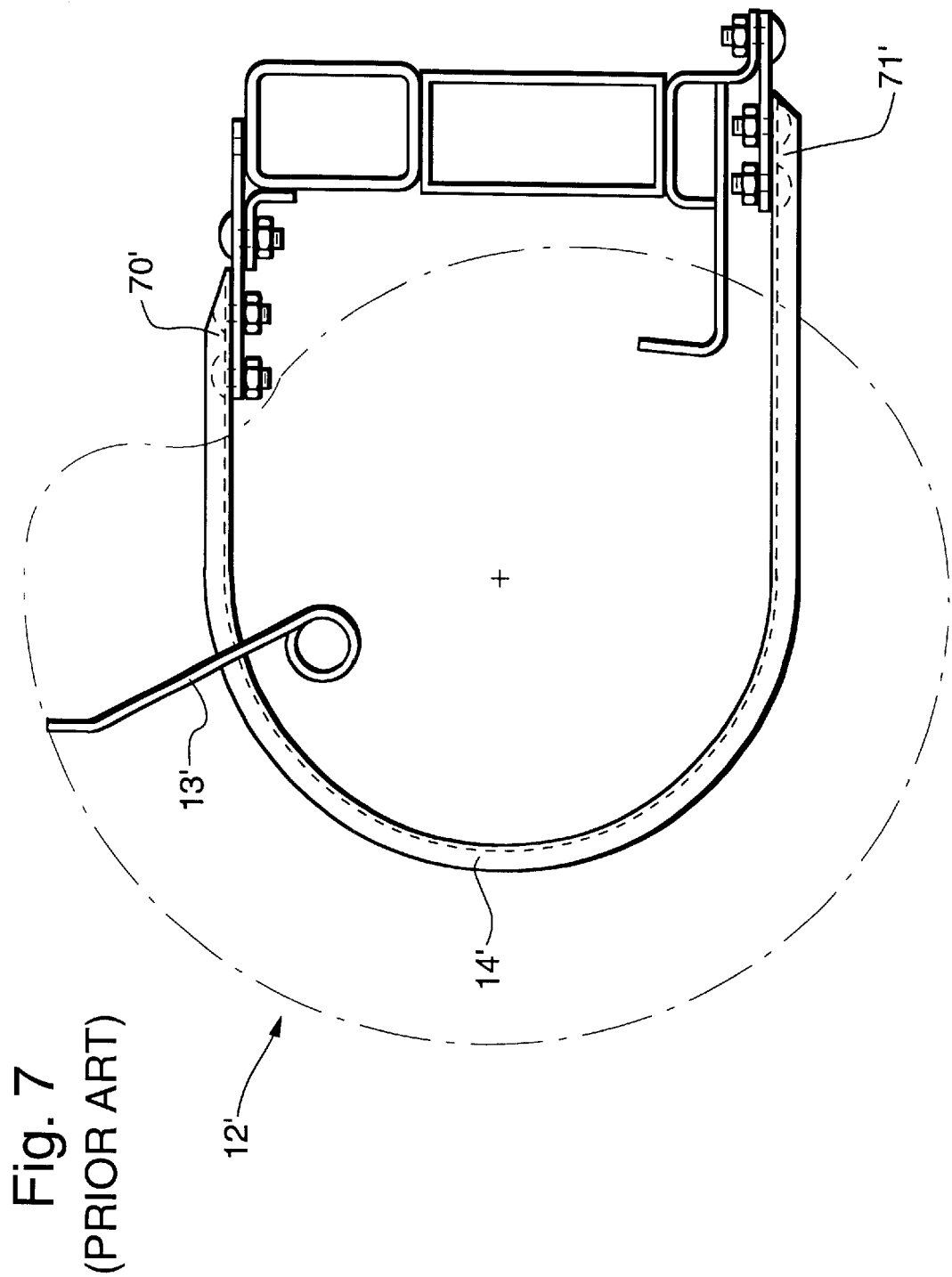
FIG. 7 is a similar side elevational view illustrating a symmetrical profile of a prior art tine guard.

The interchangeability of tine guards 14 is especially meaningful when comparing the prior art reel assembly 12', illustrated in FIG. 7, where tines 13' operate between a plurality of tine guards 14' having a well known non-symmetrical shape with first end portions 70'. The rearward extension of tine guard 71' necessitates a more rearward roller location having a resulting deleterious affect on tracking. This prior art configuration is similar to the nonsymmetrical tine guard shape shown in U.S. Pat. No. 5,052,171 described above.

Among the many important explicit and implicit advantages of the present invention is the convenience and versatility, inherent in the interchangeability featured by the above described method and structure. This enhances the effectiveness of service to the apparatus regardless of whether it takes place in the shop or in the field. It is also important to point out the cost saving factor, i.e., the life span of each tine guard is obviously extended, as is the life span of the entire assembly. The majority of wear takes place at the top of the tine guard, under conditions where the auger is moving material laterally, which in turn urges the tine laterally to sporadically engage the top inner edges of the tine guards. Thus, the life of each individual guard can be practically doubled by reversing the tine guards, putting the worn area in a location where no significant contact takes place. Also, equally as important is the ability of an entire section to be reversed during periodic servicing, contributing to convenient serviceability, as well as extending the life of the mounting plates. To reiterate, by reversing the positions of the plates, wear is evened out because the positions of the end portions of the tine guards are interchanged between the high and low wear areas.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. An improved windrow pickup attachment for a forage harvester having crop processing apparatus including an input opening for receiving crop material, said attachment comprising:

a main frame mountable on the front of said forage harvester adjacent said input opening;

a transverse reel assembly mounted on said main frame for picking up crop material from the ground;

said reel assembly including a series of tines and a plurality of arcuate side-by-side tine guards, each having first and second end portions, said tines projecting outwardly between said tine guards for engaging crop material and urging it upwardly and rearwardly along the outer surfaces of said tine guards;

a conveyor system for receiving crop material from said tine guards and feeding it to said crop processing apparatus via said input opening, the improvement comprising:

said main frame includes integral upper and lower transverse elongate generally parallel and generally symmetrical mounting surfaces;

at least two tine guard mounting assemblies each comprising an upper mounting plate attached to said upper mounting surface, each of said first end portions detachably affixed to said upper mounting plate, and a lower mounting plate attached to said lower mounting surface, each of said second end portions detachably affixed to said lower mounting plate;

said upper and lower mounting plates having substantially identical comb-like configurations comprising a series of side-by-side teeth to which said tine guards are attached;

said tine guards symmetrically shaped to permit said first end portions to be affixed to said bottom mounting plate and said second end portions to be affixed to said top mounting plate; and, said upper and lower mounting plates symmetrically shaped to permit said upper mounting plate to be affixed to said lower mounting surface and said lower mounting plate to be affixed to said upper mounting surface whereby each said fine guard mounting assembly may be individually reversed in position as well as individual tine guards.

2. The improvement of claim 1, wherein:

said tine guard end portions comprise identical upper and lower arms detachably secured to said upper and lower mounting plates, respectively, for accommodating crop material being urged rearwardly by said tines;

said lower arms being disposed in the vicinity of the ground under conditions where crop material is urged rearwardly by said tines; and said upper arms being disposed in the vicinity of the ground under conditions where said upper and lower arms are detachably secured to said lower and upper mounting plates, respectively.

* * * * *